(12) United States Patent
Wada et al.

(10) Patent No.: US 7,312,265 B2
(45) Date of Patent: Dec. 25, 2007

(54) ACRYLIC PRESSURE SENSITIVE ADHESIVE COMPOSITION AND PRESSURE SENSITIVE ADHESIVE TAPE

(75) Inventors: Hiroshi Wada, Ibaraki (JP); Michio Umeda, Ibaraki (JP); Koichi Ikeda, Ibaraki (JP); Masahiro Ohura, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 407 days.

(21) Appl. No.: 11/081,574

(22) Filed: Mar. 16, 2005

(65) Prior Publication Data

US 2005/0209380 A1 Sep. 22, 2005

(30) Foreign Application Priority Data

Mar. 17, 2004 (JP) .............................. 2004-076674

(51) Int. Cl.
*C08L 93/04* (2006.01)
(52) U.S. Cl. ............... 524/272; 428/41.5; 428/355 AC; 442/151
(58) Field of Classification Search ................ 524/272; 428/41.5, 355 AC; 442/151
See application file for complete search history.

(56) References Cited

U.S. PATENT DOCUMENTS

| | | | |
|---|---|---|---|
| 5,183,841 A | 2/1993 | Bernard | |
| 2002/0132111 A1 | 9/2002 | Zhou et al. | |
| 2005/0032963 A1* | 2/2005 | Harwell et al. | 524/474 |

FOREIGN PATENT DOCUMENTS

| | | |
|---|---|---|
| JP | 1-170679 | 7/1987 |
| JP | 7-102229 | 4/1995 |
| JP | 7-228851 | 8/1995 |
| JP | 9-272850 | 10/1997 |
| JP | 11-269439 | 10/1999 |
| JP | 2000-239632 | 9/2000 |
| JP | 2001-49217 A | 2/2001 |
| JP | 2001-139912 | 5/2001 |
| JP | 2001-152111 | 6/2001 |
| JP | 2001-240817 | 9/2001 |
| JP | 2002-129122 | 5/2002 |
| JP | 2003-193006 | 7/2003 |
| JP | 2003-253228 | 9/2003 |
| JP | 2003-253228 A | 9/2003 |

\* cited by examiner

*Primary Examiner*—Peter Szekely
(74) *Attorney, Agent, or Firm*—Knobbe Martens Olson & Bear LLP

(57) ABSTRACT

Provided is an acrylic pressure sensitive adhesive composition excellent in pressure sensitive adhesive characteristics and removability and a pressure sensitive adhesive tape using the acrylic pressure sensitive adhesive composition. An acrylic pressure sensitive adhesive composition containing an acrylic polymer obtained by at least copolymerizing a (meth) acrylic acid alkyl ester with an alkyl group having 2 to 14 carbon atoms and a carboxyl group containing unsaturated monomer copolymerizable with the (meth) acrylic acid alkyl ester, and tackifier resins, wherein the tackifier resins are respective resins each containing a natural product as a raw material, include at least 4 kinds of the resins different in a molecular structure from one another and a content of each of the tackifier resins is in the range of 5 parts by weight or more and 20 parts by weight or less relative to 100 parts by weight of the acrylic polymer.

15 Claims, 1 Drawing Sheet

[FIG. 1]
(a)
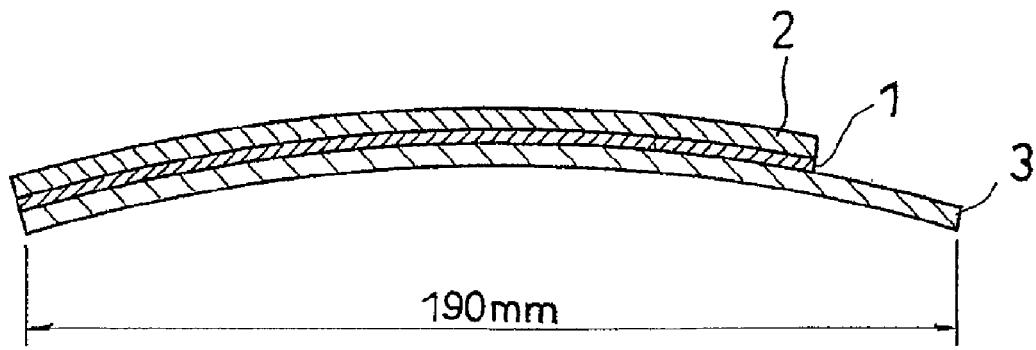
⇓
(b)
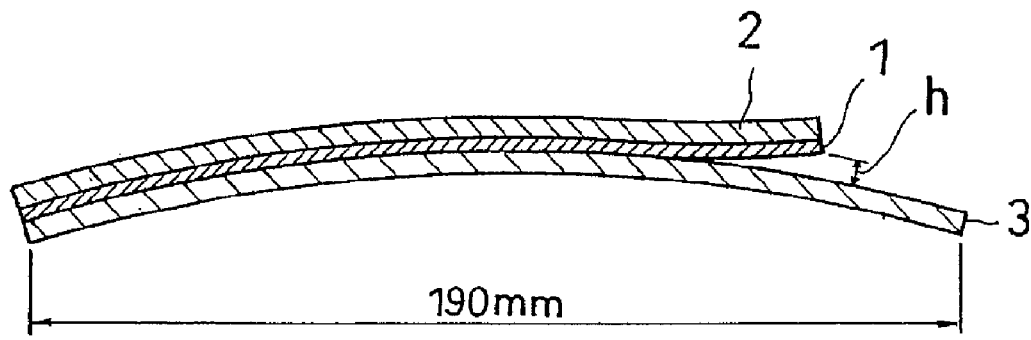

ACRYLIC PRESSURE SENSITIVE ADHESIVE COMPOSITION AND PRESSURE SENSITIVE ADHESIVE TAPE

BACKGROUND OF THE INVENTION

1. Field of the Invention

The invention relates to an acrylic pressure sensitive adhesive composition which is excellent in adhesion fixing performance and capable of being removed after the use and a pressure sensitive adhesive tape having a pressure sensitive adhesive layer formed with the pressure sensitive adhesive composition. An acrylic pressure sensitive adhesive composition and a pressure sensitive adhesive tape of the invention can also be used in application in which an object to be adhered is semipermanently fixed, while since after the tape is once adhered to an object to be adhered and kept in the state for a prescribed period, the tape can be simply removed without leaving anything, the pressure sensitive adhesive tape is especially preferable for use in removability application.

2. Description of the Related Art

A pressure sensitive adhesive tape has been used in various kinds of industrial fields such as a home electronics product, automobile and OA equipment as adhesion means good in operability and high in adhesion reliability. In recent years, from the view point of resource conservation, parts that can be recycled used in a such a product have been reused in more of cases after disassembly of the used product. In this case, if parts are adhered to each other with, for example, a both sided pressure sensitive adhesive tape, necessity arises for an operation in which the both sided pressure sensitive adhesive tape attached to the parts are removed. Various kinds of proposals have been made on both sided tapes for which such a removabiity is required.

The contents of the proposals were able to be classified into the three contents as followed:

(1) A pressure sensitive adhesive tape that is strong in a tension strength of a support base material thereof and thereby can be peeled off when being removed without breaking the support base material thereof is provided.

(2) A pressure sensitive adhesive tape that is excellent in removabiliy by controlling bulk physical properties of a pressure sensitive adhesive is provided.

(3) A pressure sensitive adhesive tape that is excellent in removability by mixing a specific tackifier resin into a specific acrylic polymer is provided.

Contents of the art that have been proposed are such that almost one, or two or more of the proposals in combination are adopted and thereby a pressure sensitive adhesive tape is provided with excellent pressure sensitive adhesive characteristics, and can be peeled off without being broken when peeled off again with no remains of the adhesive on surfaces of the parts. As for the proposal (1), it is very clear that with a stronger support base material, a pressure sensitive adhesive tape is harder to be broken. With only the use of the proposal (1), however, it is definite that the proposal cannot achieve a task that a pressure sensitive adhesive tape is excellent in pressure sensitive adhesive characteristics and that no adhesive remains are left behind when peeled off again. Therefore, many combinations of the proposals (2) and/or (3) to (1) have been designed.

For example, a proposal has been made on an acrylic pressure sensitive adhesive made of a specific acrylic copolymer and a specific acrylic tackifier resin (oligomer) (see JP-A No. 2003-1930006). A pressure sensitive adhesive layer described in JP-A No. 2003-1930006 has a purpose to prevent degradation in the layer by ultraviolet outdoors and since the pressure sensitive adhesive layer is formed by polymerization with active energy rays, an acrylic oligomer is used as a tackifier resin. However, an acrylic oligomer has a task to be unachieved in pressure sensitive adhesive performance such as repulsion resistance to a non-polar object to be adhered including polyolefin, a pressure sensitive adhesive strength and a constant load peelability. Also, it has been well known that a rosin-based resin improves an adhesiveness to a non-polar object to be adhered as a tackifier resin conventionally mixed into an acrylic pressure sensitive adhesive.

A proposal has been made on a removable both-sided tape using a non-woven fabric defined as to a weight, a grain ratio, a tensile strength, a density and compositions as a support and using a pressure sensitive adhesive having bulk physical properties such as a specific storage elastic modulus and loss tangent (see JP-A No. 2003-253228). A pressure sensitive adhesive tape described in JP-A No. 2003-253228 has purposes to decrease adhesive remains and to suppress breakage of a support base material. However, a task of adhesive remains cannot be solved only by defining the bulk physical properties. Many ideas have been conceived on combinations of acrylic polymers and tackifier resins in order to achieve similar bulk physical properties. With different materials, a different interaction inevitably entails at an interface between a pressure sensitive adhesive and an object to be adhered. That is, the difference of an interaction at an interface between a pressure sensitive adhesive and an object to be adhered varies the pressure sensitive adhesive performance and the adhesive by the selection of the materials. Bulk physical properties are only parameters. Therefore, JP-A No. 2003-253228 cannot be said that the publication discloses conditions that always can achieve compatibility between pressure sensitive performance and the removability.

A proposal has been made on a pressure sensitive adhesive tape having a pressure sensitive adhesive layer with a gel fraction of 60% or more prepared by adding a tackifier resin having a phenol group or an alkylphenol group in a molecule to a specific acrylic copolymer (see JP-A No. 2001-240817). However, in a case where a gel fraction in a pressure sensitive adhesive layer is as large as 60% or more as stated in JP-A No. 2001-240817, pressure sensitive adhesive characteristics, especially, a constant load peelability and a repulsion resistance, are extremely degraded. Therefore, JP-A No. 2001-240817 has been left with a task unachieved with respect to pressure sensitive adhesive characteristics.

A proposal has been made on a removable tape using a pressure sensitive adhesive having bulk physical properties such as a specific storage elastic modulus and a specific loss tangent, obtained by mixing 10 to 40 parts by weight of a tackifier resin to 100 parts by weight of a specific acrylic copolymer (see JP-A NO. 2000-239632). In JP-A NO. 2000-239632, it is described that at least one kind of a polymerized rosin ester resin is contained as a tackifier resin. Adhesive remains are largely affected by an interaction at an interface between a pressure sensitive adhesive and an object to be adhered as described above. Since a tackifier resin is a low molecular weight component, the resin largely affects an interaction at an interface between a pressure sensitive adhesive and an object to be adhered. In JP-A No. 2000-239632, however, there is shown no example of a tackifier resin other than polymerized rosin ester. A pressure sensitive adhesive performance and adhesive remains are largely altered by a kind of resin used together with a polymerized rosin ester. In a case where a polymerized rosin ester alone is used, if a mixing quantity thereof is small, a pressure sensitive adhesive performance is poor, while, if a mixing quantity thereof is large, a pressure sensitive adhesive force to a non-polar object to be adhered such as a polyolefin is excessively stronger, leading to adhesive remains. Therefore, in JP-A No. 2000-239632, there has remained unsolved a task of compatibility between a pressure sensitive adhesive performance and removability.

A disclosure has been made on a pressure sensitive adhesive obtained by mixing a total quantity of 5 to 45 parts by weight of a thermoplastic xylene resin and a polymerized rosin ester as tackifier resins at a ratio of (1 to 6) to (6 to 1) to 100 parts by weight of a specific acrylic copolymer (see JP-A No. 11-269439). An excessive use of thermoplastic xylene resin as a tackifier resin, however, makes worse a pressure sensitive adhesive performance in a low speed region such as a constant load peelability and a repulsion resistance, which is important practically. In a system having much of a polymerized rosin ester, a pressure sensitive adhesive force to a non-polar object to be adhered such as polyolefin is excessive stronger, resulting in adhesive remains. Therefore, in JP-A No. 11-269439, no compatibility is established between a pressure sensitive adhesive performance and removability, a task has been left unsolved.

No conventional pressure sensitive adhesive, as shown above, satisfies compatibility between performances of "being excellent in pressure sensitive adhesive characteristics and no adhesive remains being left when peeled off again" that conflict with each other, wherein the performances that conflict with each other are not explained logically. To be short, published matters shown above only defines in some form a composition of a polymer of a completed pressure sensitive adhesive tape, and mixing of a tackifier resin and, furthermore, only defines bulk physical properties as parameters. Since the contents of the proposal are not logical, there has been unachieved a task to achieve compatibility between performances of "being excellent in pressure sensitive adhesive characteristics and no adhesive remains being left when peeled off again" that conflict with each other at a high level.

SUMMARY OF THE INVENTION

The invention has been made in light of the conventional circumstances and it is an object of the invention to provide an acrylic pressure sensitive adhesive composition excellent in pressure sensitive characteristics and removability and a pressure sensitive adhesive tape using the acrylic pressure sensitive adhesive composition.

The inventors have conducted a serious study in order to carry out the task with the findings that the task can be achieved using a pressure sensitive adhesive composition and a pressure sensitive adhesive tape shown below, leading to completion of the invention.

The invention is directed to an acrylic pressure sensitive adhesive composition containing an acrylic polymer obtained by at least copolymerizing a (meth) acrylic acid alkyl ester with an alkyl group having 2 to 14 carbon atoms and a carboxyl group containing unsaturated monomer copolymerizable with the (meth) acrylic acid alkyl ester, and tackifier resins, wherein the tackifier resins are respective resins each containing a natural product as a raw material, include at least 4 kinds of the resins different in a molecular structure from one another and a content of each of the tackifier resins is in the range of 5 parts by weight or more and 20 parts by weight or less relative to 100 parts by weight of the acrylic polymer.

An acrylic pressure sensitive adhesive composition of the invention, as described above, uses at least 4 kinds of tackifier resins each having a natural product as a raw material in a specific quantity together with an acrylic polymer into which a carboxylic group is introduced. Tackifier resins each having a natural product as a raw material are excellent in adhesiveness to various kinds of objects to be adhered, and by using 4 or more kinds of such tackifier resins different in molecular structure from one another, the acrylic pressure sensitive adhesive composition is excellent in adhesive performance to objects to be adhered broadly ranging from a polar object to be adhered to a non-polar object to be adhered.

With a use quantity of each of at least 4 kinds of tackifier resins adjusted so as to be in the range of 5 parts by weight or more and 20 parts by weight or less relative to 100 parts by weight of an acrylic polymer, not only are pressure sensitive characteristics are satisfied, but removability is also satisfied so as to be no adhesive remains left on various kinds of objects to be adhered. If a mixing quantity of each tackifier resin is less than 5 parts by weight, an effect of a tackifier resin is decreased, which worsens pressure sensitive adhesive characteristics. On the other hand, if a mixing quantity of each tackifier resin exceeds 20 parts by weight, an interaction at an interface of a tackifier resin is raised, resulting in adhesive remains left when peeled off again.

At least 4 kinds of resins each containing a natural product as a raw material, used as a tackifier resin in the acrylic pressure sensitive adhesive composition, are different in clouding point for an isoparaffin hydrocarbon and clouding points of the resins are preferably different from one another by 20° C. or more.

A clouding point for an isoparaffin hydrocarbon is measured as follows:

(1) A tackifier resin was sampled in weight of 5 g and the sample is put into a test tube of a size of 6 inch in length and 1 inch in diameter.

(2) 15 g of an isoparaffin hydrocarbon (OMS) (Shell Sol 71) is added into the test tube, and then the test tube is then heated to dissolve the tackifier resin.

(3) Thereafter, the solution is gradually cooled while being agitated with a thermometer. A water bath or a dry ice-acetone bath is used when required.

(4) A temperature at which clouding gets started is recorded. A clouding point of the invention is defined as a temperature at which clouding gets started. A clouding point is a temperature at which a solution is clouded, which could include a temperature at which clouding gets started, a temperature at which the solution is perfectly clouded (at which a thermometer attached to the back wall of a test tube cannot be seen through the front wall thereof) and temperatures between both temperature, wherein in the invention, a temperature at which clouding gets started is defined as a clouding point. A temperature at which clouding gets started is easily determined, the temperature itself is very low in variation and there arises almost no variation in measurement due to a person in charge, whereas a point at which the solution is perfectly clouded is difficult in determination and, in addition, there is a possibility of a variation due to a person in charge.

Measurement of a clouding point of a tackifier resin exhibits a difference in compatibility of a tackifier resin with an isoparaffin hydrocarbon. A tackifier resin in higher clouding point means that the resin is compatible with an isoparaffin hydrocarbon at a higher temperature, which is poorer in compatibility with the isoparaffin hydrocarbon. To the contrary, a tackifier resin in lower clouding point means that the resin is better in compatibility with the isoparaffin hydrocarbon. Since an isoparaffin hydrocarbon is non-polar, a resin which is poorer in compatibility with an isoparaffin hydrocarbon is better in compatibility with a polar material, to the contrary.

Because of an interaction at an interface between a pressure sensitive adhesive composition and an object to be adhered, a phenomenon in which a tckifier resin is dissolved into an object to be adhered in a great quantity and vice versa leads to adhesive remains left when being peeled off again. To the contrary, a phenomenon in which a tckifier resin is dissolved into an object to be adhered in an excessively small quantity and vice versa leads to poor pressure sensitive adhesive performance. Therefore, in the invention, selection of at least 4 kinds of tackifier resins can be conducted with a clouding point for an isoparaffin hydrocarbon as an index from the viewpoint of compatibility between pressure sensitive adhesive performance and adhesive remains. That is, there can be preferably available a combination of 4 kinds of tackifier resins including a tackifier resin very poor in compatibility with an isoparaffin hydrocarbon (good in compatibility with a polar resin); a tackifier resin very good in compatibility with an isoparaffin hydrocarbon (good in compatibility with a non-polar resin); and other tackifier resins having intermediate compatibilities with an isoparaffin hydrocarbon.

Selection of at least 4 kinds of tackifier resins is preferably conducted so that the at least 4 kinds of tackifier resins are different in clouding point for an isoparaffin hydrocarbon from one another and a difference in clouding point between one tackifier resin and another tackifier resin is preferably 20° C. or more. With the clouding points of the selected tackifier resin of 20° C. or more in a difference between one another, pressure sensitive adhesive performance can be highly exerted for various kinds of objects to be adhered ranging from a polar object to non-polar object, and compatibility between or integration into a single piece of a pressure sensitive adhesive and an object to be adhered can be prevented in a long term storage to thereby enable adhesive remains to be reduced when peeled off again.

In an acrylic pressure sensitive adhesive composition, the resins each-containing a natural product as a raw material are preferably combination of at least 2 kinds of resins each having a softening point of 100° C. or higher and at least two kinds of resins each having a softening point of lower than 100° C.

With more of a tackifier resin with a higher softening point, a glass transition temperature of a pressure sensitive adhesive composition is higher and a tendency arises towards a low temperature adhesiveness and poor rough surface adhesiveness. On the other hand, with more of tackifier resin with a lower softening point, a tendency arises that a cohesive force at a higher temperature is worsened. From the tendencies, preferably used is a combination of at least 2 kinds of softening point of 100° C. or higher and at least 2 kinds of softening point lower than 100° C. Measurement of softening points is conducted according to a ring and ball method defined in JIS K 5601.

Resins each containing a natural product in an acrylic pressure sensitive adhesive composition preferably contains at least 4 kinds of rosin-based resins containing rosin as a raw material. A rosin-based resin is preferably as a tackifier resin for improving an adhesiveness to various kinds of objects to be adhered.

As rosin-based resins, preferably selectable to be used are at least one kind of rosin phenol resin and at least three kinds of rosin ester resins. Rosin phenol resin is excellent in pressure sensitive adhesive performance to a polar object to be adhered and rosin ester resin is excellent in pressure sensitive adhesive performance to a non-polar object to be adhered.

An acrylic pressure sensitive adhesive composition can contain a crosslinking agent.

It is preferable in an acrylic pressure sensitive adhesive composition that a peak top temperature for a shearing loss elastic modulus G" is in the range of −45° C. or higher and −25° C. or lower, and a shearing storage elastic modulus G' at 23° C. is in the range of $2 \times 10^4$ (Pa) or more and $8 \times 10^5$ (Pa) or lower.

A loss elastic modulus and a storage elastic modulus are values measured in conditions described below.

Apparatus: a visco-elasticity measuring instrument manufactured by Rheometrics Co.
Temperature: a parallel plates of a temperature of −70° C. to 150° C. and made of aluminum of 7.9 in diameter
Frequency: 1.0 (Hz)
Temperature rise speed: 5° C./min
Stress: 0.2%.

If a peak top temperature of the loss elastic modulus G" exceeds −25° C., a tendency arises that a low temperature adhesiveness and a rough surface adhesiveness are worsened. On the other hand, if a peak top temperature is lower than −45° C., a cohesive force at a high temperature tends to be worsened.

If a shearing storage elastic modulus G' is less than $2 \times 10^4$ (Pa), a cohesive force of a pressure sensitive adhesive tends to be worsened. On the other hand, if a shearing storage elastic modulus G' exceeds $8 \times 10^5$ (Pa), a rough surface adhesiveness tends to be worsened. In consideration of such a point, a shearing storage elastic modulus G' is preferably in the range of $5 \times 10^4$ (Pa) or more and $5 \times 10^5$ (Pa) or less and more preferably in the range of $8 \times 10^4$ (Pa) or more and $2 \times 10^5$ (Pa) or less.

An acrylic pressure sensitive adhesive composition is preferably used as a pressure sensitive adhesive for use in fixing recycled parts. Because of excellent pressure sensitive adhesive characteristics and removability, no adhesion shift or the like occurs even in a long term use of a pressure sensitive adhesive tape and removability is satisfactory in a case where recycled assembly parts are disassembled.

The invention relates to a pressure sensitive adhesive tape having a pressure sensitive adhesive layer formed with the acrylic pressure sensitive adhesive composition on at least one surface of a support base material.

In the pressure sensitive adhesive tape, a non-woven fabric is preferably used as the support base material.

A tensile strength of the pressure sensitive adhesive tape is preferably 20N/10 mm or more in any of an MD direction (a longitudinal direction; a flow direction) and a TD direction (a lateral direction; a width direction).

The tensile strength is preferably on the order in the range of 20 to 30N/10 mm in both directions. In a case where tensile strengths both in the MD and TD directions are 20N/10 mm or more, the pressure sensitive adhesive tape has almost no possibility to be broken even if the pressure sensitive adhesive tape is fixed for a long time and a pressure sensitive adhesive force increases, and a disassemblability of constituent parts can be better. In a case where tensile strengths of a pressure sensitive adhesive tape are less than 20N/10 mm in one of the MD and TD directions, a tendency arises that the tape is easy to be broken in a high speed peeling-off operation by hand, which is centered in disassembly operation if the pressure sensitive adhesive tape is fixed for a long time and a pressure sensitive adhesive force increases, and a disassemblability of constituent parts has a chance to be lowered.

Measurement of a tensile strength is conducted in a procedure in which samples with 10 mm width are cut in each of the TD direction and MD direction to measure the maximum stress caused when a sample is pulled at ordinary temperature (23°) at a tensile testing speed of 300 mm/min with a inter-chuck distance of 50 mm using a tension tester.

The pressure sensitive adhesive tape can be preferably used as a pressure sensitive adhesive tape for fixing recycled parts and can especially preferably be used as a both sided pressure-sensitive adhesive tape on both surfaces which pressure sensitive adhesive layers are provided on both surfaces of a support substrate.

An acrylic pressure sensitive composition and a pressure sensitive adhesive tape of the invention exerts excellent pressure sensitive adhesive performance for various kinds of object to be adhered ranging from a polar object to be adhered to a non-polar object to be adhered and can be peeled off-without leaving adhesive remains on various kinds of object to be adhered when being peeled off again after the tape is used for a long time. By selecting a support base material, a pressure sensitive adhesive tape can be easily peeled off without breaking the support base material. Such a pressure sensitive adhesive tape can ensure a removal operation to be conducted extremely efficiently, which makes disassembly and recycling of disassembled parts easy. Since the tape can be peeled off without being broken even if the tape fixes for a long time, a recycling percentage of assembled parts can be increased.

BRIEF DESCRIPTION OF THE DRAWING

FIGS. 1(a) and 1(b) are conceptual view showing a way of evaluation of curved surface adhesiveness.
1: both-sided pressure sensitive adhesive tape
2: an aluminum plate
3: object to be adhered
h: a floating height

DESCRIPTION OF THE PREFERRED EXAMPLE

An acrylic pressure sensitive adhesive composition of the invention uses, as a base, polymer an acrylic polymer obtained by at least copolymerizing (meth) acrylic acid alkyl ester with an alkyl group having 2 to 14 carbon atoms and a carboxyl group containing unsaturated monomer copolymerizable with the (meth) acrylic acid alkyl ester.

An alkyl group of an acrylic acid alkyl ester with alkyl group having 2 to 14 carbon atoms may be either of a straight chain or of a branched chain. Examples of acrylic acid alkyl ester with an alkyl group having 2 to 14 carbon atoms include: ethyl (meth) acrylate, n-propyl (meth) acrylate, n-butyl (meth) acrylate, t-butyl (meth) acrylate, 2-ethylhexyl (meth) acrylate, isooctyl (meth) acrylate, isononyl (meth) acrylate, and others. Among them, preferably used are n-butyl acrylate and 2-ethylhexyl acrylate in consideration of performance, cost and general versatility.

Preferable examples of a carboxyl group containing unsaturated monomer include (meth) acrylic acid, itaconic acid, fumaric acid, and maleic acid. Preferable to be used as a carboxyl group containing unsaturated monomer is acrylic acid in consideration of performance, cost and general versatility.

It is usually preferable that a (meth) acrylic acid alkyl ester with an alkyl group having 2 to 14 carbon atoms is usually used on the order in the range of 95 to 99 parts by weight in content and a carboxyl group containing unsaturated monomer is used on the order in the range of 1 to 5 parts by weight in content. It is more preferable that an (meth) acrylic acid alkyl ester with an alkyl group having 2 to 14 carbon atoms is used on the order in the range of 97 to 99 parts by weight in content and a carboxyl group containing unsaturated monomer is used on the order in the range of 1 to 3 parts by weight in content.

Any monomer other than acrylic acid alkyl ester with an alkyl group having 2 to 14 carbon atoms and carboxyl group containing unsaturated monomer can be copolymerized in an acrylic polymer together therewith. Examples of other monomers include: hydroxyl group containing monomers such as 2-hydroxyethyl (meth) acrylate, 2-hydroxypropyl (meth) acrylate and hydroxyhexyl (meth) acrylate; nitrogen containing (meth) acrylate such as (meth) acrylamide and acryloylmorpholine; and polar monomers such as methyl (meth) acrylate, (meth) acrylic acid alkyl with an alkyl group having 15 or more carbon atoms, and vinyl acetate. The polar monomers are effective for raising a cohesive force of a pressure sensitive adhesive. There can also be used monomers giving a polymer of a high glass transition point such as (meth) acrylonitrile, styrene, vinylidene chloride and vinyl propionate. Any monomer described above can be usually used in the range of 0 to 50 parts by weight in content relative to 100 parts by weight of (meth) acrylic acid alkyl ester with an alkyl group having 2 to 14 carbon atoms.

No specific limitation is placed on an average molecular weight of an acrylic polymer and a weight-average molecular weight (GPC) thereof is preferably on the order in the range of from 300,000 to 2,500,000. An acrylic polymer can be produced with any of various kinds of known methods and examples thereof that can be properly selected include radical polymerization methods such as a bulk polymerization method, a solution polymerization, a suspension polymerization and an emulsion polymerization.

An acrylic pressure sensitive adhesive composition of the invention uses a resin containing a natural product as a raw material, which works as a tackifier resin. Examples of natural products serving as a raw material include: terpene represented by pinene and limonene; and a material present in nature such as rosin. A tackifier resin of the invention has only to be a natural product as a raw material and includes a product modified by a chemical reaction. Examples of chemical reactions include: disporportionation of a natural product as a raw material, modification of a natural product into a derivative thereof by hydrogenation or dimerization, a modification by reacting a natural product as a raw material with unsaturated compound such as maleic acid, fumaric acid and (meth) acrylic acid by a chemical reaction, modification of a natural product as a raw material by a reaction with phenols and esterification of a natural product or a derivative thereof by a reaction with a polyvalent alcohol.

A preferable natural product is rosin. A rosin can be modified into derivatives such as a disproportionated rosin, a hydrogenated rosin, a polymerized rosin, a maleated rosin and a fumarated rosin. Preferable tackifier resins include a rosin phenol resin, and a rosin ester. Rosin phenol resins include: a resin obtained by addition reaction of a phenol to the rosin-based resin (such as natural rosin and a rosin derivative) and a so-called rosin modified phenol resin obtained by causing a resol phenol resin to react with a rosin-based resin. A rosin phenol resin can be used as a metal salt of a rosin phenol resin. A rosin ester is an esterified compound obtained by reacting the rosin-based resin with a polyvalent alcohol. And also, a rosin phenol resin can be transformed into an esterified compound.

As a product sold on the market of a tackifier resin containing a natural product as a raw material, there is available YS Polyster T145 (manufactured by YASUHARA CHEMICAL Co., Ltd.) as a terpene phenol resin. Examples of rosin phenol resins include: TAMANOL 803 (manufactured by Arakawa Chemical Industries, Ltd), TAMANOL 803L (manufactured by Arakawa Chemical Industries, Ltd), SUMILITE RESIN PR12603 (manufactured by SUMITOMO Durez Co., Ltd.) and others. Examples of rosin esters include KT-2 (manufactured by Harima Chemicals, Inc.), PENSEL D125 (manufactured by Arakawa Chemical Industries, Ltd), Pentalyn CJ (manufactured by Rika Fine-Tech Inc.) as polymerized rosin pentaerythritol esters; examples of disproportionated maleic acid modified rosin ester include: SUPER ESTER A125 (manufactured by Arakawa Chemical Industries, Ltd) and SUPER ESTER A100 (manufactured by Arakawa Chemical Industries, Ltd); and examples of hydrogenated rosin grycerin esters include: Staybelite Ester 10 (manufactured by Rika Fine-Tech Inc.), ESTER GUM H (manufactured by Arakawa Chemical Industries, Ltd) and Hercolyn D of hydrogenated rosin methyl ester (manufactured by Hercules, Japan Incorporated.); and others.

At least 4 kinds of tackifier resins each containing a natural product of the invention as a raw material used in the invention are different in molecular structure from one another. Tackifier resins are, as described above, different in clouding point for an isoparaffin hydrocarbon from one another and tackifier resins are preferably selected so that the clouding points of resins are different from one another by 20° C. or more. Tackifier resins are preferably selected so that at least two kinds of tackifier resins at a softening point of 100° C. or higher and at least two kinds of tackifier resins at a softening point of lower than 100° C. are contained.

A mixing quantity of each of tackifier resins is in the range of 5 parts by weight and more and 20 parts by weight or less relative to 100 parts by weight of an acrylic polymer. The mixing quantity is preferably in the range of 5 parts by weight or more and 15 parts by weight or less. And also, a mixing quantity of each of the tackifier resins may be either the same or different from one another.

A total mixing quantity of tackifier resins are in the range of 20 parts by weight or more and 80 parts by weight or less relative to 100 parts by weight of an acrylic polymer. A total quantity of tackifier resins is preferably in the range of 30 parts by weight or more and 60 parts by weight or less, and more preferably in the range of 30 parts by weight or more and 50 parts by weight or less. If a total mixing quantity of the tackifier resins is less than 20 parts by weight, an effect of a tackifier resin is decreased and a pressure sensitive adhesive performance is worsen as a whole. On the other hand, if a total mixing quantity exceeds 80 parts by weight, a tendency arises that a cohesive force and heat resistance are degraded.

An acrylic pressure sensitive adhesive composition of the invention can contain a crosslinking agent in addition to an acrylic polymer and tackifier resins. Examples of the crosslinking agents include: an epoxy crosslinking agent, an isocyanate crosslinking agent, an aziridine crosslinking agent and others. In order to establish compatibility between removability and a pressure sensitive adhesive performance at a high level, an isocyanate crosslinking agent is preferably used. A quantity of addition of a crosslinking agent is different depending on the use and the kind of crosslinking agent, but is 5 parts by weight or less and preferably in the range of from 0.01 to 5 parts by weight relative to 100 parts by weight of an acrylic polymer.

Additives such as a pigment, a dye, a fire retarding material, a heat stabilizer may be added to an acrylic pressure sensitive adhesive composition of the invention in a proper content as far as neither adhesive remains nor pressure sensitive adhesive characteristics are degraded.

A pressure sensitive adhesive tape of the invention can be obtained by forming a pressure sensitive adhesive layer using the acrylic pressure sensitive adhesive composition on at least one surface of a support base material. A pressure sensitive adhesive tape can be formed as a both sided pressure sensitive adhesive tape having pressure sensitive adhesive layers on both sides.

No specific limitation is placed on a support base material and example thereof include: plastic films such as a polyester film, a polyvinyl chloride film, a polyethylene film and a polypropylene film; a paper; a non-woven fabric, a metal foil, and a laminate thereof. A thickness of a support base material can be properly selected as far as a thickness thereof is in the range where no handlability is spoiled and generally on the order in the range of from 10 to 120 μm and preferably on the order in the range of 20 to 90 μm.

Preferable as a support base material is a non-woven fabric. No specific limitation is placed on a non-woven fabric and typical examples thereof include: manila hemp; a pulp; and chemical fibers such as rayon, an acetate fiber, a polyester fiber, a polyvinyl alcohol fiber, a polyamide fiber and a polyolefin fiber; and a mixture thereof. Among them, preferable is a non-woven fabric made by sheet making with a mixture of a chemical fiber (for example, polyvinyl alcohol fiber) into manila hemp. In a case where a non-woven fabric is used as a base material, the fabric can be impregnated with a viscose or other resins (binder) in order to bond non-woven fabric fibers to one another.

A density of a non-woven fabric is different even depending on a constituent material thereof. The density can be selected in a broad range of, for example, the order of from 0.1 to 0.8 g/cm$^3$ and it is especially preferably on the order in the range of 0.25 to 0.45 g/cm$^3$ from the viewpoint of easiness in impregnation with a pressure sensitive adhesive and improvement of an interlayer-strength in a non-woven fabric.

A pressure sensitive adhesive tape of the invention can be fabricated by forming a pressure sensitive adhesive layer on one surface or both surfaces of a support base material. Fabrication of a pressure sensitive adhesive layer can be conducted with a commonly used and known method in the field of pressure sensitive adhesive tapes. For example, a direct forming method in which a pressure sensitive adhesive composition is coated directly on a support base material to dry the wet coat and a transfer method in which a pressure sensitive adhesive composition is coated on a release liner and the wet layer is dried, followed by adhesion of the layer to a support base material. Of both methods, especially a direct forming method is preferable in order to prevent interlayer breakage by a support base material when the tape is peeled off. And also, no specific limitation is placed on a coating method for a pressure sensitive adhesive composition and a commonly used method can be adopted. Examples of the methods include methods using proper coating machines such as a bar coater, a spin coater, a roll coater and an applicator. No specific limitation is placed on a thickness of pressure sensitive adhesive layer, and a thickness thereof is usually on the order in the range of 25 to 100 μm.

And also, tensile strengths both in the MD and TD directions are preferably 20N/10 mm or higher so as not to leave adhesive remains and break the support base member even after a long term use of a support base material and a pressure sensitive adhesive tape. In a case where a non-woven fabric is used as a support base material, tensile strengths of the support base material and the pressure sensitive adhesive tape can be adjusted by properly selecting, for example, kinds of fibers of which a non-woven fabric is made (a material, a length, a thickness and the like), fabrication conditions for a non-woven fabric (for example, a kind and a quantity of a binder with which the non-woven fabric is impregnated, a drying temperature, a heating treatment temperature and others).

EXAMPLES

Concrete description will be given of the invention using Examples below and it should be understood the invention is not limited by the examples.

Example 1

(Preparation of Acrylic Polymer)

100 parts by weight of n-butyl acrylate, 3 parts by weight of acrylic acid, 5 parts by weight of vinyl acetate, 0.1 part by weight of 2-hydroxyethyl acrylate and 0.2 part by weight of AIBN (azobisisobutylonitrile) as a polymerization initiator were added into a total of 172 parts by weight of a mixed solvent of toluene and ethyl acetate in weight ratio of 80 to 20. Thereafter, the mixture was heated at 60° C. for 6 hr to conduct a solution polymerization and to thereby obtain an acrylic polymer. A weight-average molecular weight of obtained acrylate polymer in the solution was 600,000.

(Preparation of Acrylic Pressure Sensitive Adhesive Composition)

As a tackifier, 10 parts by weight of TAMANOL 803 (rosin phenol resin, manufactured by Arakawa Chemical Industries, Ltd) resin, 10 parts by weight of Pentalyn CJ (polymerized rosin pentaerythritol ester, manufactured by Rika Fine-Tech Inc.), 10 parts by weight of Staybelite Ester 10 (hydrogenated rosin glycerin ester, manufactured by Rika Fine-Tech Inc.), 5 parts by weight of Hercolyn D (hydrogenated rosin methyl ester, manufactured by Hercules, Japan Incorporated.) and 2 parts by weight of Coronate L (isocyanate crosslinking agent, manufactured by NIPPON POLYURETHANE INDUSTRY CO., LTD.) as a crosslinking agent were added into 100 parts by weight of the acrylate polymer solution (non-volatile matter) to thereby prepare a solution an acrylic pressure sensitive adhesive composition (solution).

Examples 2 to 4 and Comparative Examples 1 to 4

Acrylic pressure sensitive adhesive compositions (solutions) were prepared in a similar way to that in Example 1 with the exception that in Example 1, kinds and quantities of addition of tackifier resins were changed as shown in Table 1.

<Fabrication of Pressure Sensitive Adhesive Tape>

A non-woven fabric was used as a support base material. The non-woven fabric was made in a sheet from a mixture of 99 wt % of manila hemp and 1 wt % of vinylon to a thickness of 75 μm and a density of 0.31 g/cm$^3$. The acrylic pressure sensitive adhesive compositions (solutions) obtained in the examples and the comparative examples are coated on both surfaces of the respective non-woven fabric by means of the direct forming method with acrylic pressure sensitive adhesive compositions (solution) so that the weight of the wet coats were the same as each other on both surfaces, the wet coats were dried to form pressure sensitive adhesive layers and to thereby fabricate both-sided tapes each with a total thickness of 160 μm.

<Evaluation Test>

(Tape Tensile Strength)

A both-sided pressure sensitive adhesive tape was cut into a sample with a width of 10 mm in each of the TD direction and the MD direction. The sample was measured on the maximum stress generated when the sample is pulled in conditions of a chuck spacing of 50 mm and a tensile speed of 300 mm/min. using a tensile-tester to obtain tensile-strengths (N/10 mm) in the TD direction and the MD direction.

(Removability)

A both-sided pressure sensitive adhesive tape was cut in the TD direction so as to obtain a sample with a width of 5 mm. Dusting powder is scattered on one surface of the both-sided pressure sensitive adhesive tape to form a sample without pressure sensitive adhesiveness of the one surface. Such samples were adhered to an ABS plate, a polystyrene (PS) plate and a polypropylene (PP) plate, all having a thickness of 2 mm, and the adhered samples were left in conditions of 60° C. and 95% RH for 30 days. After the adhered plates were gradually cooled at ordinary temperature (23° C.) for 24 hr, the both-sided pressure sensitive adhesive tapes were peeled off at a peel speed of 300 mm/min and 180 degree peel with a tensile tester to evaluate tearability of a tape and adhesive remains on each sample under the following criteria.

Tearability was evaluated in a way such that 5 similar tests were conducted, wherein if no tear is observed on all the tests, tearability was evaluated as ○, and if tear was observed on one or two in five tests, tearability was evaluated as Δ.

If no adhesive remains were visually observed, adhesive remains were evaluated as ○, if adhesive remains were observed in an area of 20% or less of the total tape adhering area, adhesive remains were evaluated as Δ, and if adhesive remains were observed in an area of more than 20% of the total tape adhering area, adhesive remains were evaluated as x.

(Adhesive Strength)

A both-sided pressure sensitive adhesive tape was cut into a sample with a size of 20 mm×200 mm. Such samples were adhered to as objects to be adhered a SUS 304 plate and a PP plate with a roller having a weight of 2 kg by going and returning thereof each one time and left in an environment of 23° C. and 50% RH for 30 min, followed by measurement of an adhesive strength. An adhesive strength was measured with Tensilon (manufactured by Shimadzu Corp.) and the sample was pulled at a crosshead speed of 300 mm/min and a peel adhesive strength was measured at 180 degree peel.

(Retainability)

A both-sided pressure sensitive adhesive tape was cut into a sample with a size of 10 mm×100 mm. Such a sample was adhered to a bakelite plate (10 mm×20 mm) and a shift in position was measured under a load of 500 g at a temperature of 40° C.

(Curved Surface Adhesiveness)

A both-sided pressure sensitive adhesive tape was cut into a sample with a size of 20 mm×180 mm. Such a sample was adhered to an aluminum plate with a thickness of 0.4 mm and a size of 20 mm×180 mm to prepare a test piece. Such test pieces were high pressure bonded to an ABS plate with a thickness of 2 mm and a size of 30 mm×200 mm, and a PP plate with a thickness of 2 mm and a size of 30 mm×200 mm at ordinary temperature (23° C.) with a laminator and then the plates were left for 24 hr. Thereafter, the plates were bent on a chord of 190 mm in length as shown in FIG. 1(a) and in the state, put into an atmosphere at 70° C. for 72 hr to measure a floating height of the tape from the object to be adhered. A floating height is defined as h of FIG. 1(b).

As shown in Table 1, both-sided pressure sensitive adhesive tapes of the examples are excellent in any of pressure sensitive adhesive performances, are not torn off when being peeled off again even after a long time storage and can be peeled off without leaving adhesive remains on objects to be adhered with good removability. On the other hand, both-sided pressure sensitive adhesive tapes of the comparative examples are poor in any of pressure sensitive adhesive performances, tape tearability and adhesive remains.

What is claimed is:

1. An acrylic pressure sensitive adhesive composition containing an acrylic polymer obtained by at least copolymerizing a (meth) acrylic acid alkyl ester with an alkyl group having 2 to 14 carbon atoms and a carboxyl group containing unsaturated monomer copolymerizable with the (meth) acrylic acid alkyl ester, and tackifier resins,
wherein the tackifier resins are respective resins each containing a natural product as a raw material, include at least 4 kinds of the resins different in a molecular structure from one another and a content of each of the

TABLE 1

| | | Clouding point (° C.) | Softening point (° C.) | Examples | | | | Comparative Examples | | | |
|---|---|---|---|---|---|---|---|---|---|---|---|
| | | | | 1 | 2 | 3 | 4 | 1 | 2 | 3 | 4 |
| Tackifier resin (mixing quantities) | TAMANOL 803 | 50 | 145 to 160 | 10 | 10 | 15 | 15 | 10 | 25 | 15 | 15 |
| | Pentalyn CJ | 17 | 118 to 128 | 10 | 10 | 15 | 10 | 10 | 15 | | |
| | SUPER ESTER A125 | 12 | 120 to 130 | | | | | | | | 10 |
| | Staybelite Ester 10 | <−70 | 75 to 84 | 10 | | 10 | | 10 | | | |
| | ESTER GUM H | <−70 | 68 to 75 | | 10 | | 10 | 30 | | 10 | |
| | Hercolyn D | −19 | 25 or lower | 5 | 5 | 10 | 5 | 5 | 10 | 5 | 10 |
| | NIKANOL H-80 | 85 | 25 or lower | | | | | | | | 10 |
| Evaluation | Tape tensile strength (N/10 mm) | | TD | 28 | 28 | 30 | 29 | 29 | 30 | 27 | 26 |
| | | | MD | 25 | 24 | 25 | 23 | 25 | 27 | 23 | 22 |
| | Removability | Object to be adhered | ABS Adhesive remains | ○ | ○ | ○ | ○ | Δ | Δ | ○ | ○ |
| | | | Tearability | ○ | ○ | ○ | ○ | ○ | ○ | ○ | ○ |
| | | | PS Adhesive remains | ○ | ○ | ○ | ○ | Δ | Δ | ○ | ○ |
| | | | Tearability | ○ | ○ | ○ | ○ | ○ | ○ | ○ | ○ |
| | | | PP Adhesive remains | ○ | ○ | ○ | ○ | Δ | ○ | ○ | ○ |
| | | | Tearability | ○ | ○ | ○ | ○ | ○ | ○ | ○ | ○ |
| | Adhesive strength (N/20 mm) | Object to be adhered | SUS304 | 1600 | 1520 | 1650 | 1480 | 1570 | 1460 | 1200 | 1120 |
| | | | PP | 1380 | 1230 | 1400 | 1170 | 1380 | 1070 | 920 | 700 |
| | Retainability (mm) | | | 0.3 | 0.3 | 0.2 | 0.5 | 0.6 | 0.3 | 0.3 | 2.0 |
| | Curved surface adhesiveness (mm) | Object to be adhered | ABS | 0.5 | 1.5 | 1.5 | 2.0 | 6.0 | 5.0 | 20.0 | 30.5 |
| | | | PP | 0.5 | 2.0 | 1.0 | 2.0 | 5.5 | 7.0 | 33.5 | 35.5 |

In Table 1, there are shown TAMANOL 803 (rosin phenol resin, manufactured by Arakawa Chemical Industries, Ltd), Pentalyn CJ (polymerized rosin pentaerythritol ester, manufactured by Rika Fine-Tech Inc.), SUPER ESTER A125 (disproportionated maleic acid modified rosin ester, manufactured by Arakawa Chemical Industries, Ltd),: Staybelite Ester 10 (hydrogenated rosin grycerin ester, manufactured by Rika Fine-Tech Inc.), ESTER GUM H (hydrogenated rosin grycerin ester, manufactured by Arakawa Chemical Industries, Ltd), Hercolyn D (hydrogenated rosin methyl ester, manufactured by Hercules, Japan Incorporated.), and NIKANOL H-80 (xylene resin, manufactured by MITSUBISHI GAS CHEMICAL COMPANY, INC.).

tackifier resins is in the range of 5 parts by weight or more and 20 parts by weight or less relative to 100 parts by weight of the acrylic polymer.

2. The acrylic pressure sensitive adhesive composition according to claim 1, wherein at least 4 kinds of resins each containing a natural product as a raw material are different in clouding point for an isoparaffin hydrocarbon and clouding points of the resins are different from one another by 20° C. or more.

3. The acrylic pressure sensitive adhesive composition according to claim 1, wherein the resins each containing a natural product as a raw material are combination of at least 2 kinds of resins each having a softening point of 100° C. or higher and at least two kinds of resins each having a softening point of lower than 100° C.

4. The acrylic pressure sensitive adhesive composition according to claim 1, wherein the resins each containing a natural product as a raw material contains at least 4 kinds of rosin-based resins containing rosin as a raw material.

5. The acrylic pressure sensitive adhesive composition according to claim 4, wherein the rosin-based resins include at least one kind of rosin phenol resin and at least three kinds of rosin ester resins.

6. The acrylic pressure sensitive adhesive composition according to claim 1, further comprising a crosslinking agent.

7. A method of fixing a recyclable part, comprising:
providing a pressure sensitive adhesive tape having a pressure sensitive adhesive layer formed with the acrylic pressure sensitive adhesive composition according to claim 1 on at least one surface of a support base material, and
fixing a recyclable part to a desired place using the pressure sensitive adhesive tape.

8. A pressure sensitive adhesive tape having a pressure sensitive adhesive layer formed with an acrylic pressure sensitive adhesive composition according to claims 1 on at least one surface of a support base material.

9. The pressure sensitive adhesive tape according to claim 8, wherein a non-woven fabric is used as the support base material.

10. The pressure sensitive adhesive tape, according to claim 8, having a tensile strength of 20N/10 mm or more in any of an MD direction (a longitudinal direction) and a TD direction (a lateral direction).

11. The pressure sensitive adhesive tape according to claim 8, used for fixing recycled parts.

12. A pressure sensitive adhesive tape comprising:
a support base material; and
a pressure sensitive adhesive layer comprising an acrylic pressure sensitive adhesive composition on at least one surface of the support base material,
said acrylic pressure sensitive adhesive composition comprising: (i) an acrylic polymer comprising copolymerized units of a (meth) acrylic acid alkyl ester having an alkyl group of 2 to 14 carbon atoms and a carboxyl group-containing unsaturated monomer, and (ii) a tackifier resin comprising at least four structurally different resins containing natural products as raw materials, each resin being included in an amount of 5 parts by weight or more to 20 parts by weight or less relative to 100 parts by weight of the acrylic polymer.

13. The acrylic pressure sensitive adhesive composition according to claim 12, wherein the at least four structurally different reins have different clouding points for an isoparaffin hydrocarbon, which are different from one another by at least 20° C.

14. The acrylic pressure sensitive adhesive composition according to claim 12, wherein the at least four structurally different reins are a combination of at least two kinds of resins each having a softening point of 100 C. or higher and at least two kinds of resins each having a softening point of lower than 100° C.

15. A method of fixing and recycling a part, comprising: fixing the part to a desired place using the pressure sensitive adhesive tape of claim 12; detaching the part from the place by removing the tape; and recycling the part.

* * * * *